(12) United States Patent
Bordoloi et al.

(10) Patent No.: US 9,630,167 B2
(45) Date of Patent: Apr. 25, 2017

(54) NI NANO CLUSTER SUPPORT ON MGO—CEO$_2$—ZRO$_2$ CATALYST FOR TRI-REFORMING OF METHANE AND A PROCESS FOR PREPARATION THEREOF

(71) Applicant: COUNCIL OF SCIENTIFIC & INDUSTRIAL RESEARCH, New Delhi (IN)

(72) Inventors: Ankur Bordoloi, Dehradun (IN); Rajib Kumar Singha, Dehradun (IN); Rajaram Bal, Dehradun (IN); Manoj Kumar, Dehradun (IN); Chandrashekar Pendem, Dehradun (IN)

(73) Assignee: COUNCIL OF SCIENTIFIC & INDUSTRIAL RESEARCH, New Helhi (IN)

( * ) Notice: Subject to any disclaimer, the term of this patent is extended or adjusted under 35 U.S.C. 154(b) by 0 days.

(21) Appl. No.: 15/093,984

(22) Filed: Apr. 8, 2016

(65) Prior Publication Data

US 2016/0296917 A1   Oct. 13, 2016

(30) Foreign Application Priority Data

Apr. 9, 2015   (IN) .......................... 0990/DEL/2015

(51) Int. Cl.
  *C01B 3/26* (2006.01)
  *C01B 3/38* (2006.01)
  (Continued)

(52) U.S. Cl.
  CPC ............. *B01J 23/83* (2013.01); *B01J 23/002* (2013.01); *B01J 35/0013* (2013.01);
  (Continued)

(58) Field of Classification Search
  CPC ........ B01J 21/066; B01J 21/10; B01J 23/002; B01J 23/02; B01J 23/10; B01J 23/755;
  (Continued)

(56) References Cited

U.S. PATENT DOCUMENTS 6,150,299 A * 11/2000 Umemoto ................ B01J 23/10
  423/213.2
7,270,798 B2 * 9/2007 Hagemeyer .............. B01J 23/80
  423/655

(Continued)

OTHER PUBLICATIONS

Chunshan Song and Wei Pan, "Tri-reforming of methane: a novel concept for synthesis of industrially useful synthesis gas with desired h2/co ratios using co2 in flue gas of power plants without co2 separation", Prepr. Pap.-Am. Chem. Soc., Div. Fuel Chem. 2004, 49 (1), 128.

(Continued)

*Primary Examiner* — Cam N. Nguyen
(74) *Attorney, Agent, or Firm* — Norton Rose Fulbright US LLP (57) ABSTRACT

The present invention provides a Ni nano-cluster supported on MgO—CeO$_2$—ZrO$_2$ catalyst and processes the production of the catalyst. Further, the present invention discloses use of Ni nano-cluster supported on MgO—CeO$_2$—ZrO$_2$ catalyst for the synthesis gas (a mixture of CO and H$_2$) by tri-reforming of methane. The process provides a direct single step selective vapor phase tri-reforming of methane to synthesis gas over NiO—MgO—CeO$_2$—ZrO$_2$ oxide catalyst between temperature range of 600° C. to 800° C. at atmospheric pressure. The process provides a methane conversion of 1-99% with H$_2$ to CO mole ratio of 1.6 to 2.3.

14 Claims, 9 Drawing Sheets

(51) Int. Cl.
*C07C 1/02* (2006.01)
*B01J 23/00* (2006.01)
*B01J 23/02* (2006.01)
*B01J 23/06* (2006.01)
*B01J 23/10* (2006.01)
*B01J 23/40* (2006.01)
*B01J 23/42* (2006.01)
*B01J 23/58* (2006.01)
*B01J 23/83* (2006.01)
*B01J 35/00* (2006.01)
*B01J 35/02* (2006.01)
*B01J 37/04* (2006.01)
*C01B 3/40* (2006.01)

(52) U.S. Cl.
CPC ............ *B01J 35/023* (2013.01); *B01J 37/04* (2013.01); *C01B 3/40* (2013.01); *B01J 2523/00* (2013.01); *C01B 2203/0233* (2013.01); *C01B 2203/0238* (2013.01); *C01B 2203/0261* (2013.01); *C01B 2203/1041* (2013.01); *C01B 2203/1058* (2013.01); *C01B 2203/1241* (2013.01); *Y02P 20/52* (2015.11)

(58) Field of Classification Search
CPC ........ B01J 23/78; B01J 23/83; B01J 35/0013; B01J 35/023; B01J 37/04; B01J 37/08; C01B 3/40; C01B 2203/0283; C01B 2203/1241
USPC .............. 502/304, 327, 328, 337, 340, 349; 423/651, 652; 252/373
See application file for complete search history.

(56) References Cited

U.S. PATENT DOCUMENTS

| | | | | |
|---|---|---|---|---|
| 7,435,274 B2* | 10/2008 | Suenaga | ................ | B01J 15/005 422/222 |
| 7,452,842 B2* | 11/2008 | Wakatsuki | ............... | B01J 23/75 502/326 |
| 7,771,702 B2* | 8/2010 | Eyman | .................. | B01J 21/063 423/652 |
| 7,824,656 B2* | 11/2010 | Idem | ...................... | B01J 21/066 423/651 |
| 8,071,655 B2* | 12/2011 | Diehl | ....................... | B01J 21/12 502/242 |
| 8,236,726 B2* | 8/2012 | Liu | ....................... | B01J 23/8872 208/143 |
| 8,535,632 B2* | 9/2013 | Chase | ................ | B01D 53/8678 422/139 |
| 8,658,559 B2* | 2/2014 | Hong | ........................ | C01B 3/26 502/259 |
| 8,697,597 B2* | 4/2014 | Zhou | ...................... | B01J 23/002 423/651 |
| RE45,083 E * | 8/2014 | Kuno | ...................... | B01J 23/10 423/213.2 |
| 8,859,453 B2* | 10/2014 | Hong | ........................ | C01B 3/26 252/373 |
| 8,999,878 B2* | 4/2015 | Takeshima | ........... | B01D 53/945 502/100 |
| 9,012,353 B2* | 4/2015 | Golden | ................... | F01N 3/101 502/258 |
| 9,029,286 B2* | 5/2015 | Neltner | .................... | B01J 23/10 502/240 |
| 9,034,786 B2* | 5/2015 | Kumar | .................. | B01J 37/031 502/327 |

OTHER PUBLICATIONS

Jesus Manuel Garcia-Vargas et al., "Methane tri-reforming over a Ni/β-SiC-based catalyst: Optimizing the feedstock composition", International Journal of Hydrogen Energy (2013), 38(11), 4524-4532.

Lee et al., "Tri-reforming of CH4 using CO2 for production of synthesis gas to dimethyl ether", *Catalysis Today*, Journal, 87(1-4): 133-137, 2003.

Maciel et al., "Kinetic evaluation of the tri-reforming process of methane for syngas production", Reaction Kinetics, Mechanisms and Catalysis, 101(2): 407-416, 2010.

Pino et al., "Hydrogen production by methane tri-reforming process over Ni-ceria catalysts: Effect of La-doping", Applied Catalysis, B: Environmental (2011), 104(1-2), 64-73.

Tracy Benson, Preprints of Symposia—American Chemical Society, Division of Fuel Chemistry, 57: 839-840, 2012.

Wood et al., "Tri-reforming of methane over Ni@SiO2 catalyst", International Journal of Hydrogen Energy (2014), 39(24), 12578-12585.

* cited by examiner

NI NANO CLUSTER SUPPORT ON MGO—CEO$_2$—ZRO$_2$ CATALYST FOR TRI-REFORMING OF METHANE AND A PROCESS FOR PREPARATION THEREOF

FIELD OF INVENTION

The present invention relates to a Ni—MgO—CeO$_2$—ZrO$_2$ (abbreviated as Ni-MCZ) catalyst for tri-reforming of methane and a process for the preparation thereof. Particularly, the present invention relates to a process for the activation of methane via tri-reforming for the production of syngas using Ni-MCZ catalyst. More particularly, the present invention relates to a process for the Tri-reforming of methane to syngas with H$_2$ to CO molar ratio of 1.6 to 2.3 at atmospheric pressure over Ni-MCZ solid catalysts.

BACKGROUND OF THE INVENTION

Depletion of fossil fuel led the world to find out other alternative sources for energy. New fuel resources like CNG, LNG, CBM, Gas hydrates, shale gas are declared as "the fuel of future" because of its properties and potential. New fuel resources consists more than 80% methane and the other components are higher alkene gasses and nitrogen, CO$_2$, SO$_2$ etc. methane is the simplest alkane and one of the most potent greenhouse gas present in the atmosphere.

Main component of CNG (compressed natural gas), LNG (liquefied natural gas) is methane. But the production, storage and the safety problem related to these resources led the researchers to work on other alternatives with easier routes to produce fuels. The disadvantage of LNG and CNG is that it is stored at a high pressure (20 to 150 psi). The big disadvantage is the need to deal with the storage and handling of a cryogenic (−160° C., −260° F.) fluid through the entire process of bulk transport and transfer to fleet storage. The cryogenic temperature makes it extremely difficult or impossible to add an odorant. Therefore, with no natural odor of its own, there is no way for personnel to detect leaks unless the leak is sufficiently large to create a visible condensation cloud or localized frost formation. Typical LNG storage vessels are inner pressure vessel made from nickel steel or aluminum alloys exhibiting high strength characteristics under cryogenic temperatures several inches of insulation in a vacuum environment between the outer jacket and the inner pressure vessel. Stationary tanks often use finely ground perlite powder, while portable tanks often use aluminized mylar super-insulation. Outer vessel made of carbon steel and not normally exposed to cryogenic temperatures.

Unlike CNG, LNG cannot be odorized; therefore, there is some concern about the ability of personnel to detect TLV (Threshold limit value) concentrations. This is another reason to ensure that methane detectors are in place wherever personnel may be exposed. Now methane can be utilized via methanol synthesis or with Fischer-Tropsch synthesis. And these processes proceed using synthesis gas. Now methane can be activated to produce synthesis gas with different reforming processes. Partial oxidation, Dry reforming, steam reforming are the primary routes to produce synthesis gas (mixture of CO and H$_2$). Partial oxidation is a process with a major advantage of producing synthesis gas with H$_2$/CO ratio 2, which is desired for the methanol synthesis in the Fischer-Tropsch process. But the process has its own limitations. The process is difficult to control because of its exothermic nature and local heat generation on the catalyst surface. The problem is mostly with the Ni-catalysts. The dry reforming of methane is another process to produce synthesis gas. The H$_2$/CO ratio obtained in this case is 1. Commercially synthesis gas is produced by steam reforming of methane. The obtained H$_2$/CO ratio is 3. So, dry reforming and steam reforming has problems with the H$_2$/CO ratio used in the FT synthesis. Nowadays researchers are working on new ideas to produce synthesis gas from methane. Bi-reforming, auto thermal reforming, tri-reforming of methane are the processes by which synthesis gas can be produced. These are the new area of research to establish a new process for the generation of synthesis gas.

Methanol is supposed to be a future fuel with very high energy density. Methanol is produced in the Fischer-Tropsch synthesis using synthesis gas (mixture of H$_2$ and CO) with H$_2$/CO ratio 2. Tri-reforming of methane can produce synthesis gas with different H$_2$/CO ratio by variation of feed ratios. Now, with a definite feed ratio we can also get H$_2$/CO ratio 2 which is the major requirement for methanol synthesis in FT Synthesis.

Tri reforming is a modern technique which is used for the direct production of methanol from new fuel resources or methane with desired H$_2$:CO ratio. As the name suggests it is a combination of three reforming processes: a) Steam methane reforming, b) Partial oxidation and c) Dry reforming.

The very motive of developing this was to make use of the energy loss taking place and also to overcome the disadvantages of dry reforming, i.e., a) Coke deposition, and b) Short catalyst life.

The various advantages of tri reforming of methane are:
a) Desired syngas ratio can be produced which in turn will have quality applications.
b) The carbon deposition on the catalyst can be significantly reduced by the steam and oxygen used which will increase the catalyst life as well as efficiency of the operation.
c) Energy efficiency of the reactor is increased as oxidation is an exothermic reaction and the heat generated in situ can be used for other reforming reactions.
d) Flue can be directly used rather than separating the individual constituents hence saving cost and complexity.
e) The conversion of methane and carbon dioxide is high.
f) There is no need of handling pure oxygen if the reactant source is flue gas.

The major disadvantages include:
a) Flue gases contain inert nitrogen gas in high concentrations, hence proper disposal of nitrogen and also other toxic gases present in flue gases such as SO$_x$, NO$_x$ and other toxic substances must be considered in the conversion process design.
b) There is still a need for an effective conversion of CO$_2$ in presence of O$_2$ and H$_2$O.
c) Tri reforming has not been studied systematically.

Therefore, it is obvious that tri-reforming of methane can be very useful if it can be used with in a proper way.

Reference can be made to the article International Journal of Hydrogen Energy (2013), 38(11), 4524-4532, where Jesus Manuel Garcia-Vargas et. al. reported Ni/β-siC-based catalyst for the tri-reforming of methane. They reported 95.9% methane conversion at 800° C.

Reference can be made to the article Preprints of Symposia—American Chemical Society, Division of Fuel Chemistry (2012), 57(1), 839-840 where Tracy J Benson reported Ni catalyst supported on titanium oxide.

Reference can be made to the article Applied Catalysis, B: Environmental (2011), 104(1-2), 64-73 where Lidia Pino et al. reported tri-reforming of methane over Ni—$CeO_2$ catalysts with different La loadings at 800° C. with $CH_4$ and $CO_2$ conversion of 96% and 86.5% respectively.

Reference can be made to the article Reaction Kinetics, Mechanisms and Catalysis, Volume 101, Issue 2, Pages 407-416 where Leonardo J. L. Maciel et al. reported methane and carbon dioxide conversions of 97.35% and 46.75% with Ni/γ-$Al_2O_3$ catalyst at over 727° C.

Reference can be made to the article Catalysis Today, Volume 87, Issue 1-4, Pages 133-137, Journal, 2003 where Lee Seung-Ho reported Ni/$ZrO_2$ catalyst for the tri-reforming of methane.

Reference can be made to the article International Journal of Hydrogen Energy (2014), 39(24), 12578-12585 where Joseph Wood reported Ni@$SiO_2$ core shell catalyst for the tri-reforming of methane. They reported 71.2 and 63.0 methane and $CO_2$ conversion at 750° C. with $CH_4$:$CO_2$:$H_2O$:$O_2$:He feed ratio 1:0.5:1.0:0.1:0.4 and the drawback of the report is the catalyst stability. The catalyst shows deactivation after 4 hrs. of time on stream.

Reference can be made to the article Preprints of Papers—American Chemical Society, Division of Fuel Chemistry 2004, 49 (1), 128 where Song reported 96% methane and 81% $CO_2$ conversion at 800° C. with $H_2$/CO mole ratio 1.72.

In the earlier reports the best $H_2$/CO observed for the tri-reforming reaction is in between 1.5-2. However, we have observed bit higher than 2, which is quite significant for syngas conversion process.

OBJECTS OF THE INVENTION

The main objective of the present invention is to a Ni—MgO—$CeO_2$—$ZrO_2$ (abbreviated as Ni-MCZ) catalyst for tri-reforming of methane and a process for the preparation thereof.

Another objective of the present invention is to provide a process for activation of methane to syngas over Ni-MCZ catalyst.

Still another objective of the present invention is to provide a process, which selectively gives syngas from methane with $H_2$/CO mole ratio between 1.6 to 2.

Yet another objective of the present invention is to provide a process which uses most abandoned new fuel resources having the potential to become the main source for the future fuel alternatives to produce synthesis gas, which is the main composition for the production of hydrocarbon by means of Fischer-Tropsch process.

Yet another objective of the present invention is to provide a process which works under continuous process at atmospheric pressure for the production of synthesis gas from methane.

Yet another objective of the present invention is to provide a process which works under continuous process at atmospheric pressure for the production synthesis gas from methane, carbon dioxide and water.

Yet another objective of the present invention is to provide a catalyst with a mixture of Ni, Mg, Ce and Zr oxide which can be prepared easily and also very economical to produce syngas via Tri-reforming of methane.

SUMMARY OF THE INVENTION

Accordingly, the present invention provides a nanoNi—Mg—Ce—Zr oxide catalyst having formula NiO—MgO—$CeO_2$—$ZrO_2$ comprises NiO in the range of 2.5-10 wt %, MgO in the range of range 1-5 wt %, $CeO_2$ in the range of 20-25 wt % and $ZrO_2$ in the range of 60-72.5 wt %.

In an embodiment of the present invention a process for the preparation of nano Ni—Mg—Ce—Zr oxide catalyst, wherein the said process comprising the steps of:
a) stirring zirconium salt with ethanol for a period ranging between 1-2 h at temperature ranging between 25-35° C.
b) preparing second solution by stirring a surfactant and ethanol for a period ranging between 1-2 h at temperature ranging between 25-30° C. subsequently adding magnesium salt and cerium salt and ethanol during continuous stirring and covering with paraffin film and left for stirring at temperature ranging between 25-35° C. for a period ranging between 10-14 h.
c) mixing both solutions as prepared in step (a) and step (b) and stirring for 7-8 hrs at temperature ranging between 25-35° C. followed by drying at temp ranging between 50-70° C. and calcining at temperature ranging between 400° C.-600° C. for a period ranging between 5-7 h to obtain magnesium-cerium-zirconium oxide support;
d) preparing aqueous solution of Nickel salt preferably Nickel nitrate with stirring for a period ranging between 1-2 hr at temperature ranging between 25-30° C. and adding magnesium-cerium-zirconium oxide support as obtained in step (c) into it;
e) preparing second solution of urea in water with stirring for a period ranging between 1-2 hr at temperature ranging between 25-30° C.;
f) mixing both solutions as obtained in step (d) and (e) with stirring for a period ranging between 10-14 hrs at a temperature ranging between 25-30° C., subsequently setting the temperature at 70-100° C. followed by cooling after 24-48 hrs, filtering and calcining at temperature ranging between 400° C.-600° C. for a period ranging between 5-7 hrs to obtain nanoNi—Mg—Ce—Zr oxide catalyst.

In one embodiment of the present invention the Zr salt used in step (a) is zirconium isopropoxide.

In another embodiment of the present invention the Mg and Ce salt used in step (b) is magnesium nitrate hexahydrate and cerium nitrate hexahydrate.

Still in another embodiment of the present invention the surfactant used in step (b) is P123 (Pluronic acid) poly (ethylene glycol)-poly(propylene glycol)-poly(ethylene glycol).

Still in another embodiment of the present invention wt % ratio of Ni and MCZ is in the range of 2.5:97.5-10:90.

Still in another embodiment of the present invention mole ratio of zirconium salt, cerium salt and magnesium salt is in the range of $23 \times 10^{-3}$:$5 \times 10^{-3}$:$6 \times 10^{-3}$ to $25 \times 10^{-3}$:$6 \times 10^{-3}$:$7 \times 10^{-3}$.

Still in another embodiment of the present invention the particle size of the catalyst is in the range of 5-10 nm.

Still in another embodiment of the present invention a process for activation of methane using nanoNi—Mg—Ce—Zr oxide to obtain syngas, wherein the said process comprises passing $O_2$:$CO_2$:$H_2O$:$CH_4$:He mixture with a molar ratio of 1:1:1.7:5:18 to 1:1:2.4:5:18 in a reactor at atmospheric pressure in the presence of Nano Ni—Mg—Ce—Zr oxide catalyst at a temperature ranging between 600°-800° C. for a period ranging between 1-100 hrs at a gas hourly space velocity (GSHV) ranging between 20000-200000 ml$g^{-1}h^{-1}$ to obtain syngas.

Still in another embodiment of the present invention the conversion of methane is in the range of 50-99%.

Still in another embodiment of the present invention the $H_2$/CO ratio of syngas obtained in the range of 1.6-2.3.

Still in another embodiment of the present invention the conversion of carbon dioxide is in the range of 43-94%.

Still in another embodiment of the present invention the conversion of steam is in the range of 49-95%.

BRIEF DESCRIPTION OF DRAWING

FIG. 4 (a) Mapping of Ni in 2.5% Ni-MCZ; (b) Mapping of Mg in 2.5% Ni-MCZ; (c) Mapping of Ce in 2.5% Ni-MCZ; (d) Mapping of Zr in 2.5% Ni-MCZ.

FIG. 8 (a) Mapping of Ni in 5% Ni-MCZ; (b) Mapping of Mg in 5% Ni-MCZ; (c) Mapping of Ce in 5% Ni-MCZ; (d) Mapping of Zr in 5% Ni-MCZ.

FIG. 9 (a) TPR of 2.5% Ni-MCZ; (b) TPR of 5% Ni-MCZ.

DETAILED DESCRIPTION OF THE INVENTION

The present invention provides a nanoNi—Mg—Ce—Zr oxide catalyst having formula NiO—MgO—$CeO_2$—$ZrO_2$ comprises NiO in the range of 2.5-10 wt %, MgO in the range of range 1-5 wt %, $CeO_2$ in the range of 20-25 wt % and $ZrO_2$ in the range of 60-72.5 wt % with particle size of the catalyst is in the range of 5-10 nm.

The present invention provides a process for the preparation of Ni-MCZ to produce synthesis gas by Tri-reforming of methane involves the following steps.

The process for the preparation of Ni nano-cluster supported MgO—$CeO_2$—$ZrO_2$ catalyst comprising the steps of:
a) Synthesis of Ni-MCZ was carried out using organic matrix decomposition method.
b) Zirconium isopropoxide, magnesium nitrate hexahydrate, cerium nitrate hexahydrate, nickel nitrate hexahydrate, P123 (Pluronic acid), urea, ethanol, $H_2O$ were used for the synthesis where the metal nitrate salts were used as the respective precursors.
c) The molar ratio of Zirconium isopropoxide to ethanol was varied in the range of 1:57.
d) The molar ratio of P123 to ethanol was varied in the range of 1:950.
e) After adding magnesium nitrate and cerium nitrate to the above mixture the solution was left for stirring 8-14 hrs.
f) Mixture of all the solution was stirred for 7-8 hrs.
g) The whole mixture was dried at 60° C.
h) The dried mixture was calcined at 400° C. for 5-8 hrs.

Loading of Ni on Support:
a) Taken 750 ml of $H_2O$ in a beaker and added 0.37 g to 1.48 g of Nickel nitrate.
b) Continued stirring for 1 hr.
c) In another beaker taken 750 ml of $H_2O$ and add 0.25 gm to 1 gm of urea in this beaker.
d) Continued stirring for 1 hr.
e) In first beaker added 3 gm support and mixed both solutions.
f) Continued stirring for 1 hr.
g) The temperature was raised to 90° C. and kept for 48 hrs.
h) Cooled to room temperature calcined at 400° C. for 5-8 hrs.

EXAMPLES

The following examples are given by way of illustration of working of the invention in actual practice and should not be constructed to limit the scope of the present invention in any way.

General Procedure for the Tri-Reforming of Methane to Synthesis Gas

The Tri-reforming of methane was carried out in a fixed-bed down flow reactor at atmospheric pressure. Typically 10 to 500 mg of catalyst was placed in between two quartz wool plugged in the center of the 6 mm quartz reactor. The reaction was carried out with the freshly prepared catalyst at different temperatures ranging 600°-800° C. The flow of feed gasses are controlled by mass flow controllers. The gas hourly space velocity (GHSV) was varied between 20000 to 200000 ml g-1 h-1 with a molar ratio of O2:CO2:H2O:CH4:He of 1:1:1.8:5:18 to 1:1:2.4:8:18. The reaction products were analyzed using an online gas chromatography (Agilent 7890A) fitted with a TCD detector using two different columns Molecular sieves (for analyzing H2) and Pora-Pack-Q (for analyzing CH4, CO2 and CO).

Example-1

Preparation of MCZ 7.54 g zirconium isopropoxide was taken in beaker and 50 ml ethanol was added and kept for stirring after covering it with paraffin film at temperature 30° C. for a period 1 hr. In another beaker 4.1 g P123 (Pluronic acid) was taken and 30 ml ethanol was added and kept for stirring at temperature 30° C. for a period 1 h. 1.58 g Magnesium Nitrate and 2.32 g Cerium Nitrate was added during continuous stirring. And 20 ml ethanol was added and covered with paraffin film and left for stirring 12 h at temperature 30° C. Both solutions were mixed in one beaker. After about 7 hrs of stirring, it was left for drying at 60° C. for 48 h and calcined at 400° C. for 5 hrs.

Preparation of 2.5% Ni-MCZ:

Taken 750 ml of $H_2O$ in a beaker and added 0.37 g of Nickel nitrate in it and kept on stirring for 1 hr at 30° C. In another beaker taken 750 ml of $H_2O$ and add 0.25 g of urea in this beaker and kept it on stirring for 1 hr at 30° C. In first beaker added 3 gm support and mixed both solutions. After 1 hr of stirring at temp 30° C., set the temperature at 90° C. After 48 hrs it was cooled and filtered and calcined at 400° C. for 5 hrs.

The materials were characterized by XRD, SEM, elemental mapping and TEM.

Figure 1:
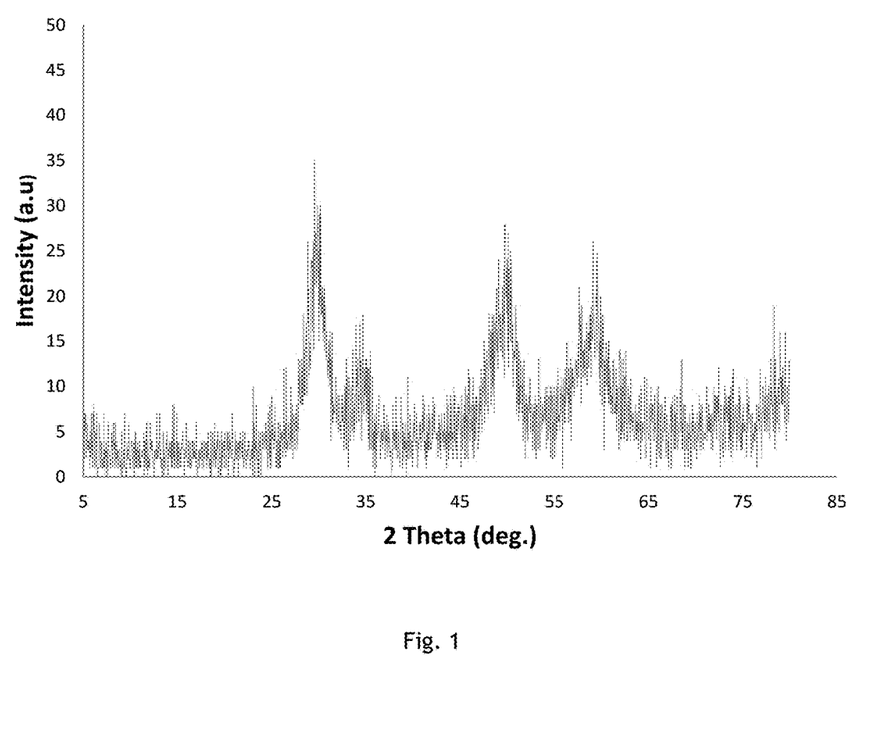
FIG. 1 X-ray Diffraction (XRD) of 2.5% Ni-MCZ.
Figure 2:
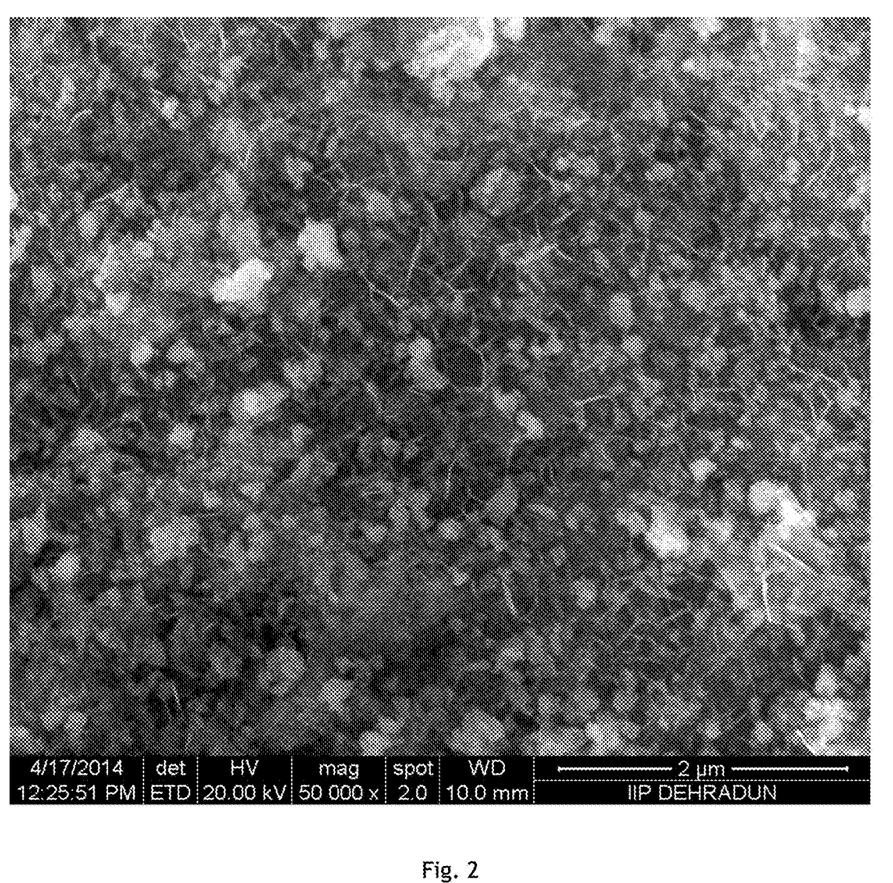
FIG. 2 Scanning Electron Microscope (SEM) image of 2.5% Ni-MCZ.
Figure 3:
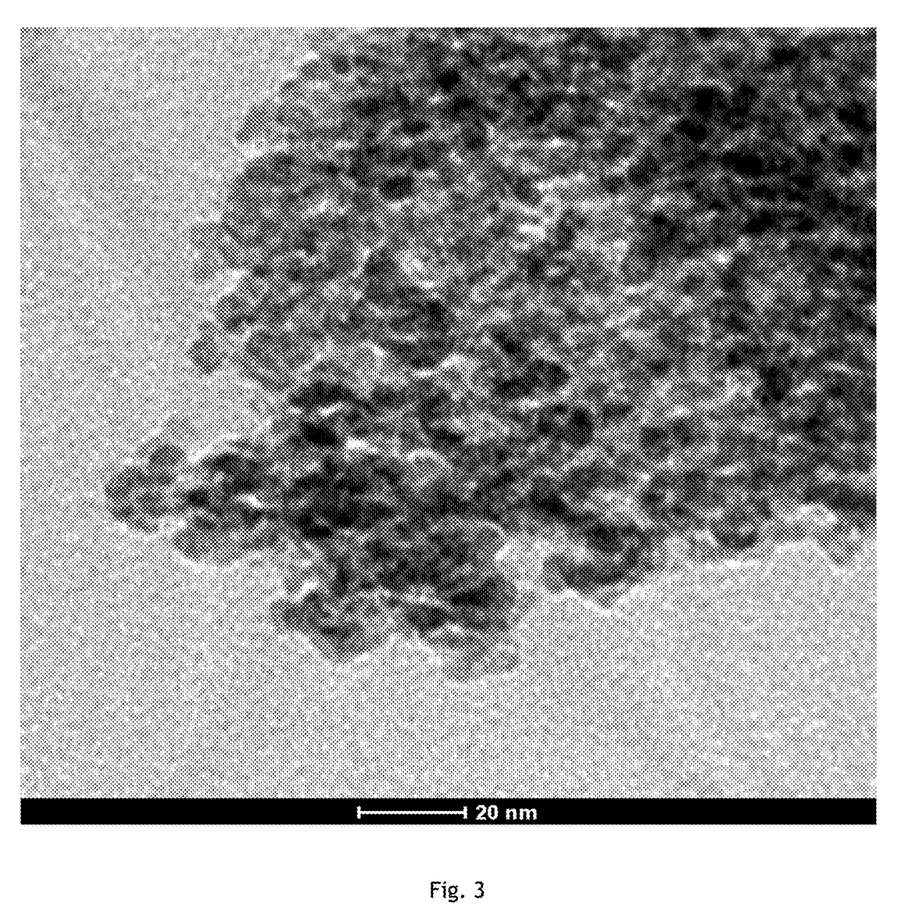
FIG. 3 TEM image of 2.5% Ni-MCZ.
Figure 4:
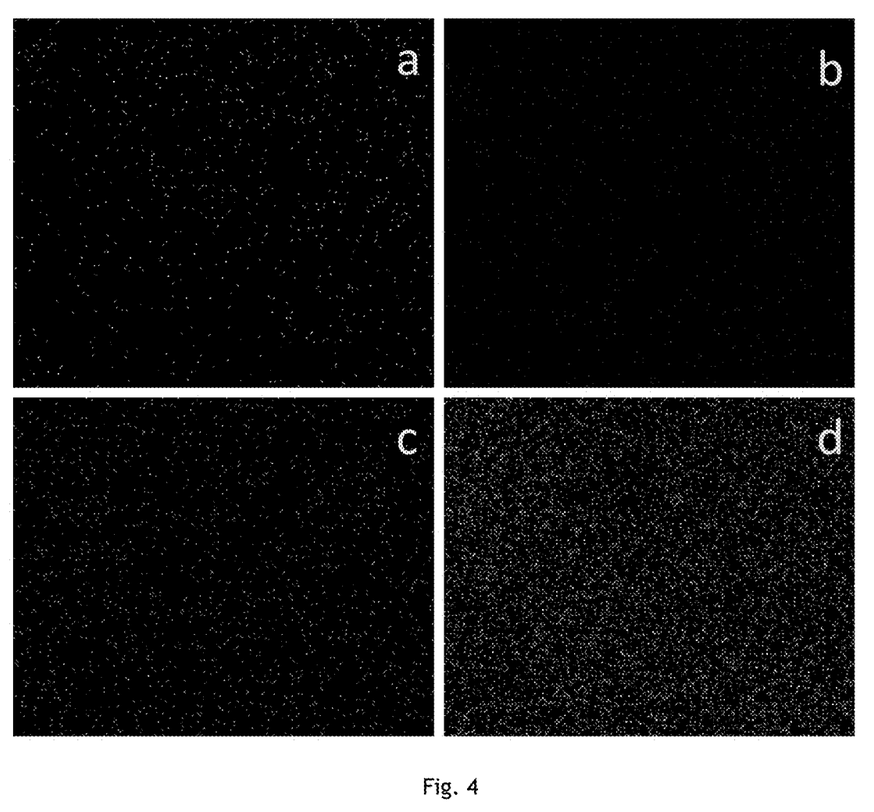
Figure 5:
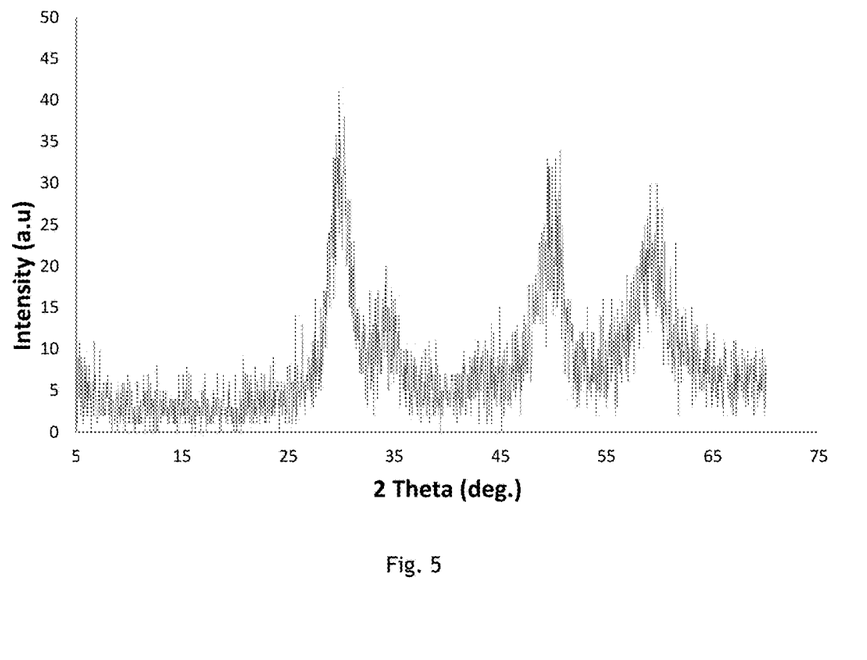
FIG. 5 X-ray Diffraction (XRD) of 5% Ni-MCZ.
Figure 9:
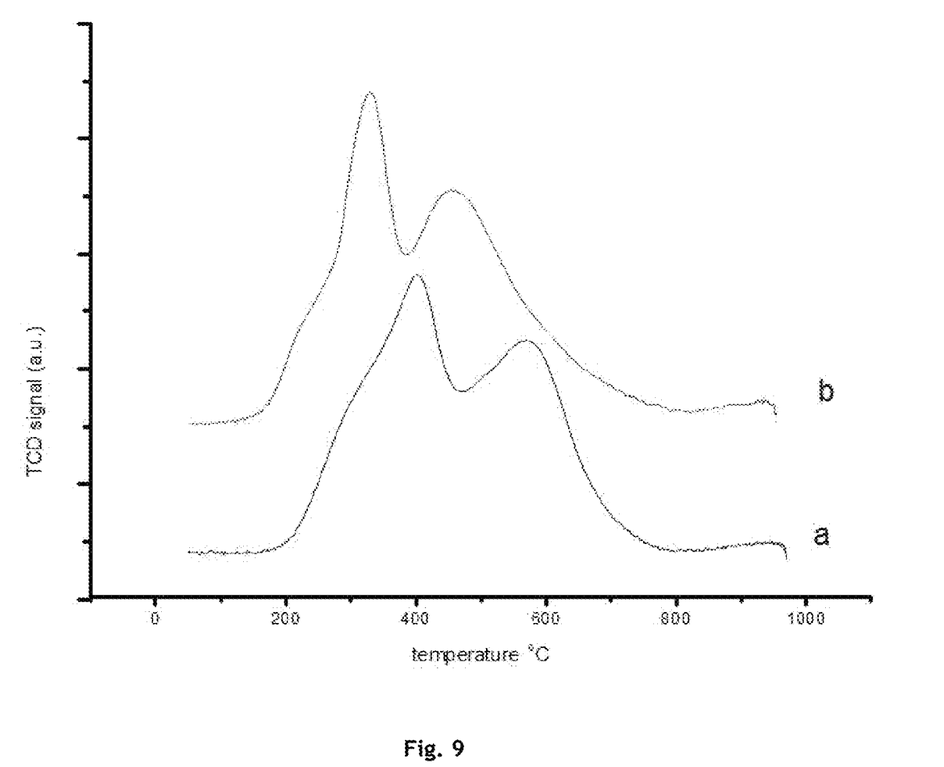

The XRD pattern of the 2.5% Ni-MCZ is shown in FIG. 1. XRD depicts the presence of Ni nitrate, MgO2, $CeO_2$ and $ZrO_2$ in the sample. The morphology of the material (2.5% Ni-MCZ) was characterized by SEM. The typical image of the 2.5% Ni-MCZ is shown in FIG. 2. From the SEM image it is clear that the particles are almost spherical in shape. The typical TEM images of the 2.5% Ni-MCZ are shown in FIG. 3. The dispersion of the Ni particles on MCZ support was analyzed by taking the elemental mapping of Ni, Mg, Ce, and Zr using SEM as shown in FIG. 5(a,b,c,d) respectively. The mapping confirms that Ni is highly dispersed on MCZ. FIG. 9 represents the TPR profile (a) of the catalyst 5% Ni-MCZ. The catalyst contains 2.5 wt. % NiO, 1 wt. % MgO, 20 wt. % $CeO_2$, 76.5 wt. % $ZrO_2$.

Example-2

Preparation of MCZ 7.54 g zirconium isopropoxide was taken in beaker and 50 ml ethanol was added and kept for stirring after covering it with paraffin film at temperature 30° C. for a period 1 hr. In another beaker 4.1 g P123 (Pluronic acid) was taken and 30 ml ethanol was added and kept for stirring at temperature 30° C. for a period 1 h. 1.58 g Magnesium Nitrate and 2.32 g Cerium Nitrate was added during continuous stirring. And 20 ml ethanol was added and covered with paraffin film and left for stirring 12 hrs at temperature 30° C. Both solutions were mixed in one beaker and after 7 hrs of stirring, it was left for drying at 60° C. for 48 h and calcined at 400° C. for 5 hrs.

Preparation of 5% Ni-MCZ:

Taken 750 ml of $H_2O$ in a beaker and added 0.74 g of Nickel nitrate in it and kept on stirring for 1 hr at 30° C. In another beaker taken 750 ml of $H_2O$ and add 0.46 g of urea in this beaker and kept it on stirring for 1 hr at 30° C. In first beaker added 3 gm support and mixed both solutions. After 1 hr of stirring at temp 30° C., set the temperature at 90° C. After 48 hrs it was cooled and filtered and calcined at 400° C. time 5 hrs.

The materials were characterized by XRD, SEM, elemental mapping and TEM.

Figure 6:
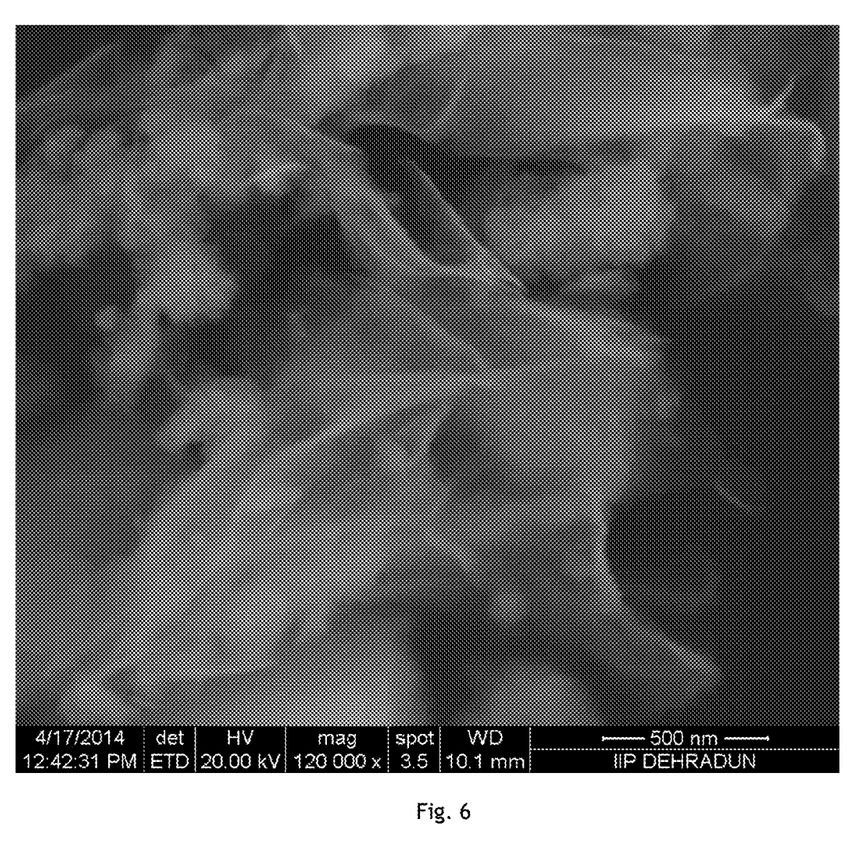
FIG. 6 SEM image of 5% Ni-MCZ.
Figure 7:
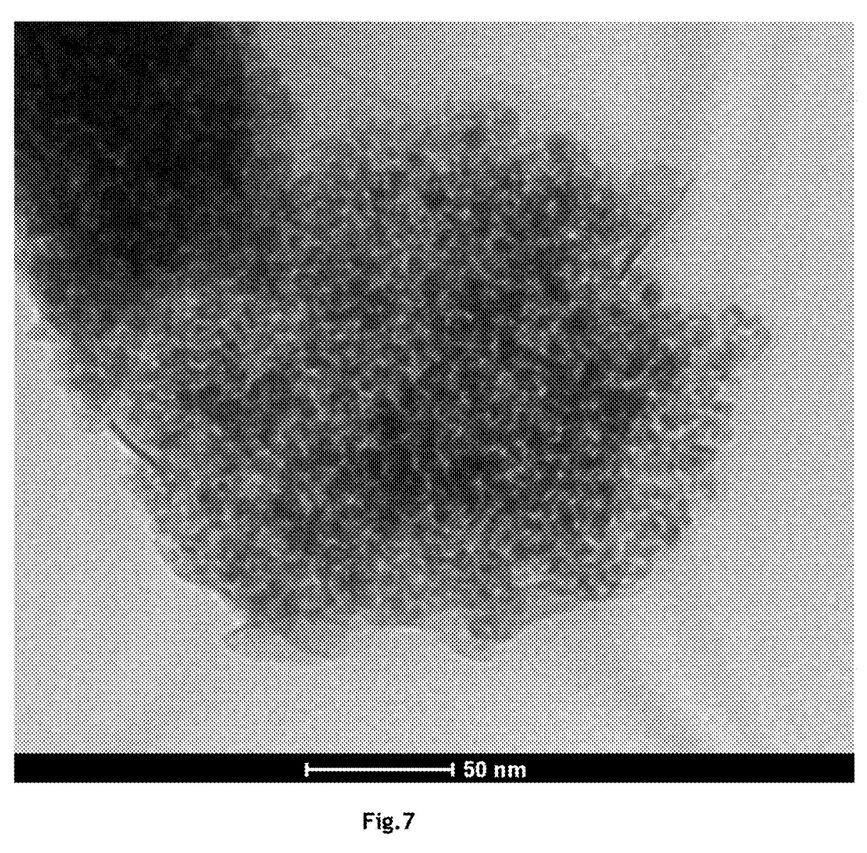
FIG. 7 TEM image of 5% Ni-MCZ.
Figure 8:
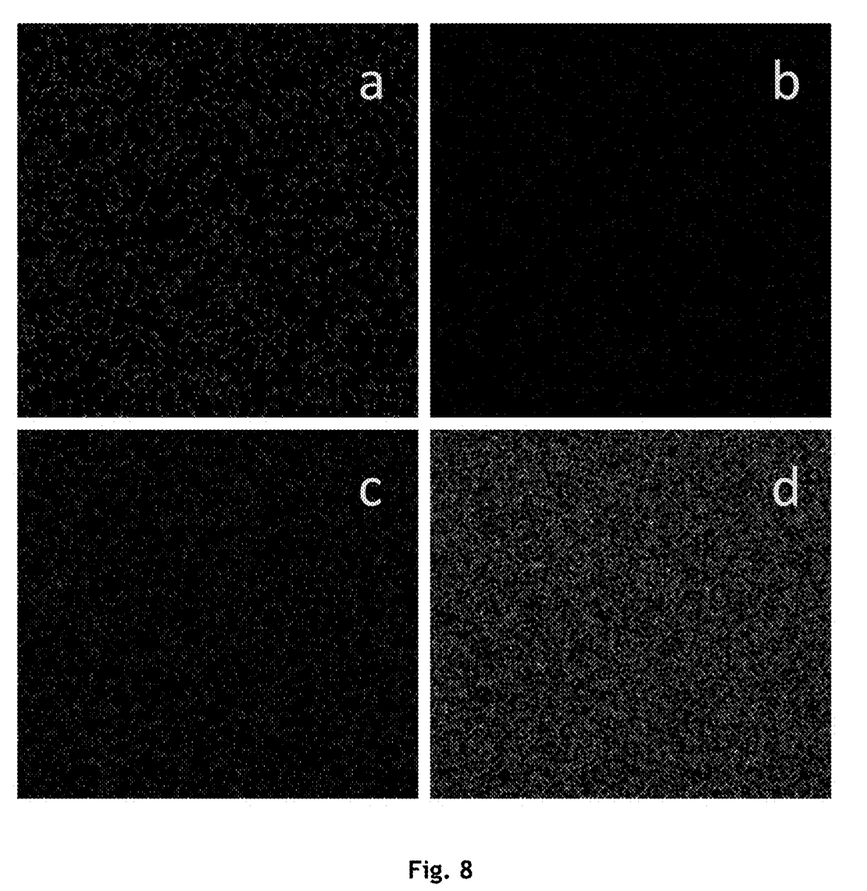

The XRD pattern of the 5% Ni-MCZ is shown in FIG. 5. XRD depicts the presence of Ni nitrate, $MgO_2$, $CeO_2$ and $ZrO_2$ in the sample. The morphology of the material (5% Ni-MCZ) was characterized by SEM. The typical image of the 5% Ni-MCZ is shown in FIG. 6. From the SEM image it is clear that the particles are almost spherical in shape. The typical TEM images of the 5% Ni-MCZ are shown in FIG. 7. The dispersion of the Ni particles on MCZ support was analyzed by taking the elemental mapping of Ni, Mg, Ce, and Zr using SEM as shown in FIG. 8 (a,b,c,d), respectively. The mapping confirms that Ni is highly dispersed on MCZ. FIG. 9 represents the TPR profile (b) of the catalyst 5% Ni-MCZ. The catalyst contains 5 wt. % NiO, 1 wt. % MgO, 20 wt. % $CeO_2$, 74 wt. % $ZrO_2$.

Example-3

The example describes the effect of temperature on conversion and $H_2/CO$ ratio of partial oxidation of methane. The product analysis presented in Table 1.

Process Conditions:
Catalyst: 0.24 g
Ni:MCZ weight ratio in the catalyst=2.5:97.5
Process pressure: 1 atm.
Gas hourly space velocity (GHSV): 20000 ml $g^{-1}$ $h^{-1}$
Reaction time: 4 hrs
$O_2:CO_2:H_2O:CH_4:He=1:1:2:5:18$ (mol %)

TABLE 1

Effect of temperature on conversion

| Temperature (° C.) | Methane Conversion (%) | $CO_2$ Conversion (%) | $H_2O$ Conversion (%) | Syngas $H_2/CO$ ratio |
|---|---|---|---|---|
| 600 | 71.69 | 11.53 | 59.10 | 2.3 |
| 700 | 91.29 | 70.06 | 90.15 | 2.2 |
| 800 | 98.32 | 89.76 | 94.99 | 2.0 |

Example-4

The example describes the effect of temperature on the conversion of methane and $H_2/CO$ ratio of partial oxidation of methane. The product analysis presented in Table 2.

Process Conditions:
Catalyst: 0.060 g
Ni:MCZ weight ratio in the catalyst=2.5:97.5
Process pressure: 1 atm
Gas hourly space velocity (GHSV): 80000 ml $g^{-1}$ $h^{-1}$
Temperature: 600-800° C.
Reaction time: 4 hrs
$O_2:CO_2:H_2O:CH_4:He=1:1:2:5:18$ (mol %)

TABLE 2

Effect of temperature on conversion

| Temperature (° C.) | Methane Conversion (%) | $CO_2$ Conversion (%) | $H_2O$ Conversion (%) | Syngas $H_2/CO$ ratio |
|---|---|---|---|---|
| 600 | 67.56 | 41.53 | 59.96 | 2.2 |
| 700 | 89.46 | 72.36 | 88.15 | 2.1 |
| 800 | 96.32 | 94.01 | 93.8 | 2.1 |

Example-5

The example describes the effect of gas hourly space velocity on the conversion of methane and $H_2/CO$ ratio of partial oxidation of methane. The product analysis presented in Table 3.

Process Conditions:
Catalyst: 0.030 g
Ni:MCZ weight ratio in the catalyst=2.5:97.5
Process pressure: 1 atm
Temperature: 800° C.
Reaction time: 4 hrs
$O_2:CO_2:H_2O:CH_4:He=1:1:2:5:18$ (mol %)

TABLE 3

Effect of gas hourly space velocity (GHSV) on the conversion of methane and $H_2/CO$ ratio of partial oxidation of methane

| GHSV (ml feed/h/$g_{cat}$) | Methane Conversion (%) | $CO_2$ Conversion (%) | $H_2O$ Conversion (%) | Syngas $H_2/CO$ ratio |
|---|---|---|---|---|
| 20000 | 98.32 | 89.76 | 94.99 | 2.1 |
| 50000 | 93.78 | 86.67 | 89.26 | 2.1 |
| 100000 | 88.65 | 84.86 | 85.69 | 2.1 |
| 200000 | 68.80 | 61.79 | 64.39 | 2.1 |

Example-6

The example describes the effect of time on stream on conversion of methane and $H_2/CO$ ratio of dry reforming of methane. The product analysis presented in Table 4

Process Conditions:
Catalyst: 0.06 g
Ni:MCZ weight ratio in the catalyst=2.5:97.5
Process pressure: 1 atm
Gas hourly space velocity (GHSV): 80000 ml $g^{-1}$ $h^{-1}$
Reaction temperature: 800° C.
$O_2:CO_2:H_2O:CH_4:He=1:1:2:5:18$ (mol %)

TABLE 4

| Time (h) | Methane Conversion (%) | CO$_2$ Conversion (%) | H$_2$O Conversion (%) |
|---|---|---|---|
| 0 | 95.52 | 94.41 | 96.32 |
| 1 | 96.45 | 92.14 | 95.69 |
| 2 | 95.99 | 92.48 | 96.17 |
| 4 | 96.54 | 90.15 | 94.73 |
| 6 | 98.50 | 91.14 | 95.30 |
| 8 | 98.62 | 92.73 | 95.49 |
| 10 | 99.31 | 92.90 | 94.83 |
| 15 | 96.48 | 93.19 | 94.48 |
| 20 | 96.47 | 93.46 | 95.11 |
| 25 | 97.33 | 91.04 | 95.49 |
| 30 | 96.30 | 94.01 | 96.50 |
| 40 | 95.80 | 94.62 | 95.69 |
| 50 | 96.30 | 94.14 | 95.40 |
| 60 | 94.52 | 94.13 | 96.76 |
| 70 | 96.16 | 94.12 | 95.68 |
| 80 | 95.96 | 94.52 | 95.56 |
| 90 | 97.52 | 90.16 | 95.29 |
| 100 | 97.51 | 90.44 | 95.51 |

Advantages of the Present Invention

The main advantages of the present invention are:
a) The process of the present invention is to utilize methane by converting methane to syngas through Tri-reforming of methane in a single step with a single catalyst.
b) The process of the present invention is to utilize carbon dioxide to produce syngas through Tri-reforming of methane in a single step with a single catalyst.
c) The process of the present invention is to utilize steam by to produce syngas through Tri-reforming of methane in a single step with a single catalyst.
d) The process provides not only good conversion but also good H$_2$/CO ratio of syngas.
e) The process utilizes a major component of abandoned new fuel resources to produce syngas with H$_2$/CO ratio almost equal to two, which become the major advantages of this process and which can be directly use for the production of methanol and Fischer-Tropsch synthesis.
f) The process utilizes three greenhouse gasses to produce synthesis gas.
g) The process does not produce any major by-products which is also a major advantage of this process.
h) The catalyst shows no deactivation up to 100 h time on stream at 800° C.;
i) The catalyst is used in very low amounts.

We claim:

1. A nano Ni—Mg—Ce—Zr oxide catalyst having a formula NiO—MgO—CeO$_2$—ZrO$_2$ (NiO-MCZ) which comprises NiO in a range of 2.5-10 wt %, MgO in a range of 1-5 wt %, CeO$_2$ in a range of 20-25 wt % and ZrO$_2$ in a range of 60-72.5 wt %.

2. The catalyst as recited in claim 1, having a particle size of 5-10 nm.

3. The catalyst as recited in claim 1, wherein the wt % ratio of Ni and MCZ is in range of 2.5:97.5-10:90.

4. A process for the preparation of nano Ni—Mg—Ce—Zr oxide catalyst as recited in claim 1, wherein said process comprises the steps of:
a) stirring zirconium salt with ethanol for a period ranging between 1-2 hours at a temperature ranging between 25-35° C.;
b) preparing a second solution by stirring a surfactant and ethanol for a period ranging between 1-2 hours at a temperature ranging between 25-30° C. subsequently adding magnesium salt and cerium salt and ethanol during continuous stirring and covering with paraffin film and stirring at a temperature ranging between 25-35° C. for a period ranging between 10-14 hours;
c) mixing both solutions as prepared in step (a) and step (b) and stirring for 7-8 hours at a temperature ranging between 25-35° C. followed by drying at temp a temperature ranging between 50-70° C. and calcining at a temperature ranging between 400° C.-600° C. for a period ranging between 5-7 hours to obtain a magnesium-cerium-zirconium oxide support;
d) preparing an aqueous solution of nickel salt with stirring for a period ranging between 1-2 hours at a temperature ranging between 25-30° C. and adding the magnesium-cerium-zirconium oxide support as obtained in step (c) into it;
e) preparing a separate solution of urea in water with stirring for a period ranging between 1-2 hours at a temperature ranging between 25-30° C.; and
f) mixing both solutions as obtained in step (d) and (e) with stirring for a period ranging between 10-14 hours at a temperature ranging between 25-30° C., subsequently setting the temperature at 70-100° C. followed by cooling after 24-48 hours and filtering and calcining at a temperature ranging between 400° C.-600° C. for a period ranging between 5-7 hours to obtain nano Ni—Mg—Ce—Zr oxide catalyst.

5. The process as recited in claim 4, wherein Zr the zirconium salt used in step (a) is zirconium isopropoxide.

6. The process as recited in claim 4, wherein the magnesium and cerium salt used in step (b) are magnesium nitrate hexahydrate and cerium nitrate hexahydrate, respectively.

7. The process as recited in claim 4, wherein the surfactant used in step (b) is P123 (Pluronic acid).

8. The process as recited in claim 4, wherein the nickel salt used in step (d) is nickel nitrate.

9. The process as recited in claim 4, wherein the wt % ratio of Ni and MCZ is in range of 2.5:97.5-10:90.

10. The process as recited in claim 4, wherein the mole ratio of zirconium salt, cerium salt and magnesium salt is in a range of 23:5:6 to 25:6:7.

11. A process for production of methane using nano Ni—Mg—Ce—Zr oxide catalyst to obtain syngas, wherein said process comprises passing an O$_2$:CO$_2$:H$_2$O:CH$_4$:He mixture with a molar ratio of 1:1:1.7:5:18 to 1:1:2.4:5:18 in a reactor at atmospheric pressure in the presence of a nano Ni—Mg—Ce—Zr oxide catalyst at a temperature ranging between 600°-800° C. for a period ranging between 1-100 hours at a gas hourly space velocity (GSHV) ranging between 20,000-200,000 mlg$^{-1}$h$^{-1}$ to obtain syngas.

12. The process as claimed in claim 11, wherein the process produces a H$_2$/CO ratio 2.

13. The process as claimed in claim 11, wherein the conversion of methane is in a range of 50-99% over 5-10 nm catalyst particles.

14. The process as claimed in claim 11, wherein a H$_2$/CO ratio of syngas obtained in a range of 1.6-2.3 over 5-10 nm catalyst particles.

* * * * *